United States Patent

[11] 3,618,843

| [72] | Inventors | Robert R. Hayes<br>Euclid;<br>Barry L. Laidman, Cleveland, both of Ohio |
|---|---|---|
| [21] | Appl. No. | 829,438 |
| [22] | Filed | June 2, 1969 |
| [45] | Patented | Nov. 9, 1971 |
| [73] | Assignee | The Dow Chemical Company<br>Midland, Mich. |

[54] APPARATUS FOR JOINING METAL FOIL LAMINATES
12 Claims, 5 Drawing Figs.

| [52] | U.S. Cl. | 228/3, 29/497.5 |
|---|---|---|
| [51] | Int. Cl. | B23k 21/00, B23p 3/02 |
| [50] | Field of Search | 228/3; 29/497.5 |

[56] References Cited
UNITED STATES PATENTS

| 3,309,766 | 3/1967 | Rozmus | 228/3 |
|---|---|---|---|
| 3,420,429 | 1/1969 | Lewis | 228/3 |
| 3,432,912 | 3/1969 | Doherty | 228/3 |
| 3,483,610 | 12/1969 | Campo | 228/3 |

Primary Examiner—John F. Campbell
Assistant Examiner—Donald P. Rooney
Attorneys—Griswold & Burdick, Richard G. Waterman and Robert B. Ingraham ABSTRACT: An apparatus is described suitable for the cold welding of metal foil or plastic-metal laminates such as aluminum-polyethylene wherein electrical contact is obtained by forming a weld through at least one layer of plastic of the laminate.

PATENTED NOV 9 1971

INVENTORS.
Robert R. Hayes
BY Barry L. Laidman

Robert B. Ingraham
AGENT

APPARATUS FOR JOINING METAL FOIL LAMINATES

Laminates of plastic film and a metal film or foil find wide application in many fields. One field where such laminates or laminate foils are particularly desirable is that of cable shielding. Beneficially, a cable may be shielded conveniently by overwrapping either in a spiral manner or in a longitudinal straight fold, generally axially disposed to provide relatively low cost electrostatic shielding of a cable. The suitable laminates of metal foil and plastic material are prepared by methods well known to the art and applied conveniently to cables employing conventional cable machinery. Although the use of the plastic-metal laminates permits the application of two or more materials to a cable in a single operation, difficulty is encountered in joining the ends of the plastic-metal laminates. Various techniques have been employed including spot welding and like joining techniques wherein the plastic layer or layers is first removed and metal-to-metal contact obtained. It is known that such laminates may be cold welded to provide electrical conductivity between adjacent pieces by passing the laminate between a generally flat surface such as the surface of a hardened dowel pin and an anvil under a pressure of about 100,000 pounds per square inch developing maximum pressure over a period of at least 0.1 second. Such a cold welding procedure is very desirable in that it avoids the time consuming necessity of cleaning the metal to obtain metal-to-metal contact prior to cold welding. However, as oftentimes such laminates are employed in the form of tape or ribbon, varying in width from a fraction of an inch to several inches and commonly handled in rolls containing several thousand feet, it is desirable that such welds be made with minimal apparatus and provide the desired end result. For example, conventional cold pressure welding apparatus for joining tape or film 20 inches in width is massive, requires a relatively large amount of floor space and a very substantial investment.

It would be desirable if there were an improved apparatus available suitable for the cold welding of metal foil and metal foil-plastic foil laminates.

It would be beneficial if such apparatus were physically relatively small and did not require substantial auxiliaries such as large high-pressure hydraulic systems and the like.

It would also be desirable if such an apparatus were relatively simple and capable of welding foils of varying widths.

These benefits and other advantages in accordance with the present invention are achieved in an apparatus for the cold welding of metallic foils, the apparatus comprising a press, the press having a reciprocating ram, the reciprocating ram supporting at least one pressure element, an anvil oppositely disposed from said ram and adapted to clamp a foil to be joined between said pressure element and said anvil, the improvement which comprises a foil support table, the foil support table comprising a first portion and a second portion, each of the table portions having a foil retaining means, means to move said table relative to said anvil in a sequential stepwise manner upon reciprocation of the ram.

Further features and advantages of the present invention will become more apparent from the following specification taken in connection with the drawing wherein.

Figure 1:
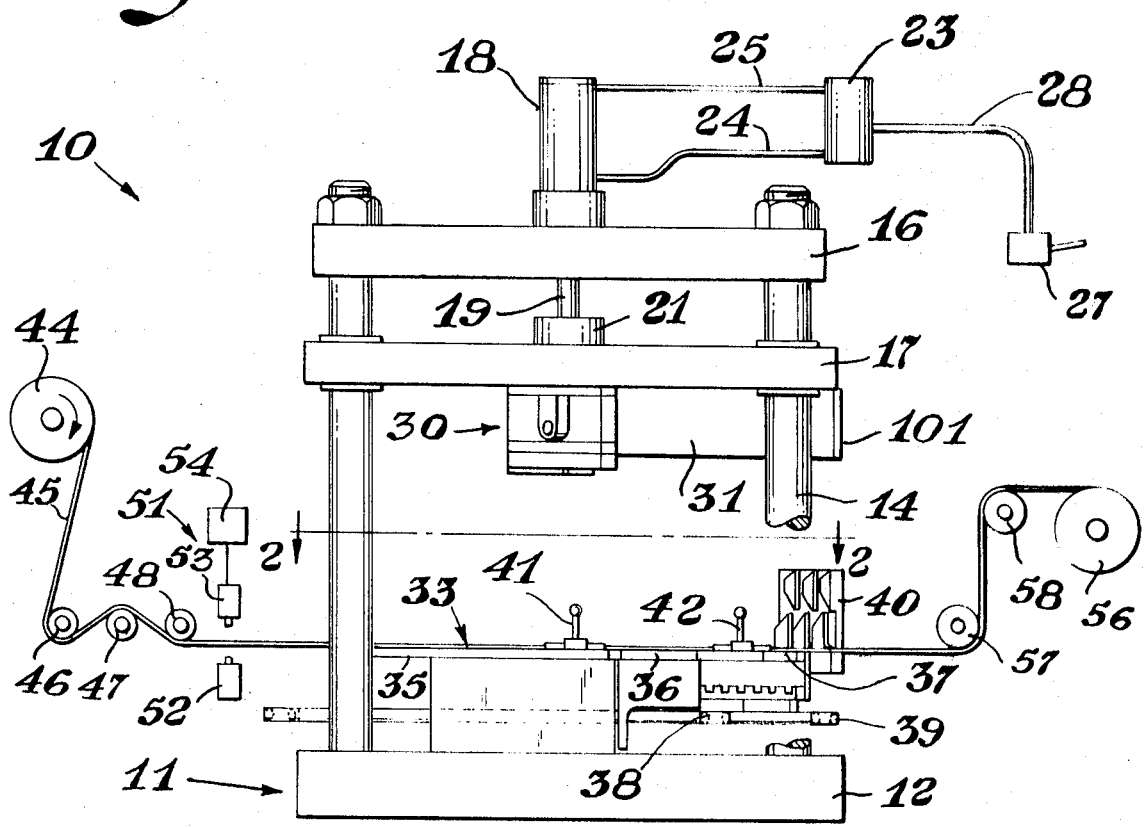
FIG. 1 is a schematic representation of a welding apparatus in accordance with the present invention.

In FIG. 1 there is schematically depicted an apparatus in accordance with the present invention generally designated by the reference numeral 10. The apparatus 10 comprises in cooperative combination a support means or frame 11. The frame 11 comprises a base member or bottom platen 12 having generally vertically extending tie bars 14 (two shown), an upper fixed platen 16 remotely disposed from the base 12, a moveable platen 17 slidably supported upon the tie bars 14 and disposed between the lower or bottom platen 12 and the fixed platen 16. A hydraulic cylinder or reciprocating means 18 is affixed to the upper platen 16. The cylinder 18 has reciprocally mounted therein a ram 19. The ram 19 passes through a suitable opening (not shown) in the upper fixed platen 16 and is affixed to the movable platen 17 by a retaining collar 21. The cylinder 18 is in operative communication with a source 23 of hydraulic fluid under pressure by means of lines 24 and 25. A control element or hydraulic valve 27 is in operative communication with the source 23 by means of a line 28. Manipulation of the control means 27 such as a valve or switch causes the ram 19 to extend or retract from the cylinder 18 thereby moving the sliding platen 17 toward or away from the bottom or fixed platen 12. Affixed to the moveable platen 17 is a welding and flattening head generally designated by the reference numeral 30. The head 30 has affixed thereto a cam follower plate 31. Affixed to the base of the fixed platen 12 is a support table 33. The support table 33 has a first fixed portion 35 and moveable portions 36 and 37 supported on ways 38 and 39, respectively. Supported on the moveable portion 37 is a cam plate 40. A first foil clamping member 41 is affixed to the moveable member 36 and a second foil clamping member 42 is affixed to the member 37. A metal foil source 44 is disposed adjacent the frame 11 and provides a metal foil with or without a thermoplastic layer adhered thereto. The source 44 comprises a foil 45 wound onto a roll of desired size. The foil 45 is dispensed from the source 44, passes through flattening and tensioning rolls 46, 47 and 48, respectively, to a heat sealing apparatus 51. The heat sealing apparatus 51 comprises a fixed jaw 52, a moveable jaw 53 and a heat source 54. Beneficially, the heat sealer 51 may be of any desired conventional design and is adapted to provide sufficient heat to bond a plastic layer on a laminate to a like plastic layer of another foil thereby providing a convenient means of initially joining foils if the foils to be joined are plastic coated. A takeup roll 56 is remotely disposed from the source 44 and is adapted to receive foils joined by the apparatus 10. In association with the takeup toll 56 are tensioning and flattening rolls 57 and 58, respectively.

Figure 2:
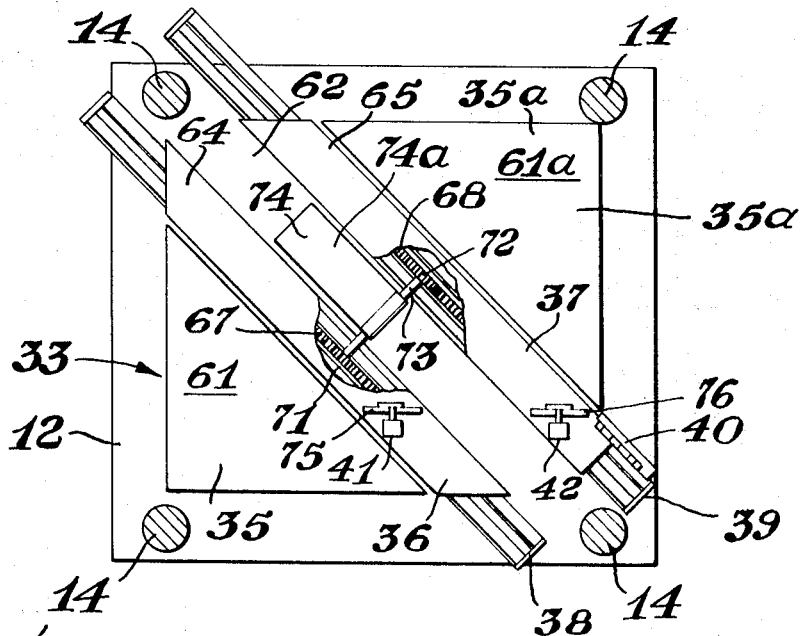
FIG. 2 is a schematic view of the apparatus taken along the line 2–2 of FIG. 1.

In FIG. 2 there is depicted a partial schematic cutaway view of the apparatus of FIG. 1 taken along the like 2–2 of FIG. 1. The base or fixed platen 12 supports four tie bars 14 and the support table 33. The table 33 comprises a first fixed portion 35 and a second oppositely disposed fixed portion 35a. The portions 35 and 35a each have an upwardly facing portion 61 and 61a. The portions 35 and 35a define a space 62 therebetween. Within the space 62 is disposed the first sliding member 36 and the second sliding member 37 slidably supported on the ways 38 and 39, respectively. The portions 36 and 37 have faces 64 and 65, respectively, disposed in the plane of the faces 61 and 61a. The portions 36 and 37 have affixed thereto racks 67 and 68, respectively, and are slidably supported on the ways 38 and 39. The racks 67 and 68 are in engagement with pinion gears 71 and 72, respectively. The pinion gears are operatively connected to a shaft 73 which is rotatably supported on the platen 12. Thus, the portions 36 and 37 slide on the ways 38 and 39 and maintain a generally fixed relative position to each other. The portions 36 and 37 support foil guides 75 and 76, respectively. The foil guides 75 and 76 are generally colinearly arranged and provide a convenient means of index adjustment of the ends of foil to be joined. Adjacent the foil guides 75 and 76 are disposed the foil clamping means 41 and 42, respectively. The cam plate 40 is rigidly affixed to the support portion 37 and is adapted to cooperate with the cam follower plate 31. An anvil 74 having a work engaging surface 74a is generally centrally disposed on the base or lower platen 12 and in a space defined between the sliding portions 36 and 37. The work engaging surface 74a is generally coplanar with the surfaces 61, 61a, 64 and 65.

Figure 3:
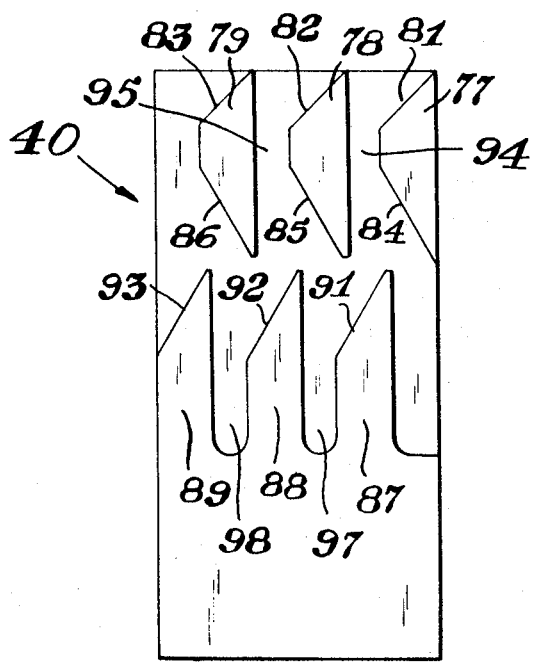
FIG. 3 is a schematic view of a cam plate employed in the apparatus of FIG. 1.

FIG. 3 shows a side view of the cam plate 40. The cam plate 40 has disposed thereon in spaced generally parallel relationship first, second and third double ended cams 77, 78 and 79. The double ended cams 77, 78 and 79 have first camming faces 81, 82 and 83 and second camming faces 84, 85 and 86, respectively. The first camming faces 81, 82 and 83 are angularly disposed with regard to the direction of travel of the ram 19 and the second camming faces 84, 85 and 86 are in generally mirror image relationship thereto about a plane normal to the axis of the ram 19 or its direction of travel. First, second and third single faced cams 87, 88 and 89 having camming faces 91, 92 and 93, respectively, are disposed generally adjacent the second camming faces of the cams 77, 78 and 79, respectively. Between the cams 77 and 78 and 78 and 79 are defined recesses 94 and 95 adapted to pass a cam follower. Between the cams 87 and 88 and 88 and 89 are defined spaces or recesses 97 and 98 adapted to pass a cam follower. The double faced cams 77, 78 and 79 and the single faced cams 87, 88 and 89 are axially offset in such a manner that a cam follower passing within the space 94 engages the face 91 and on further travel toward the bottom of the cam as pictured passes into the space 97. On reversal of the travel of the cam, the cam engages the face 85 and passes into the space 95 between the cams 78 and 79 displacing the cam plate a distance equal to the centerline distance between adjacent cams.

Figure 4:
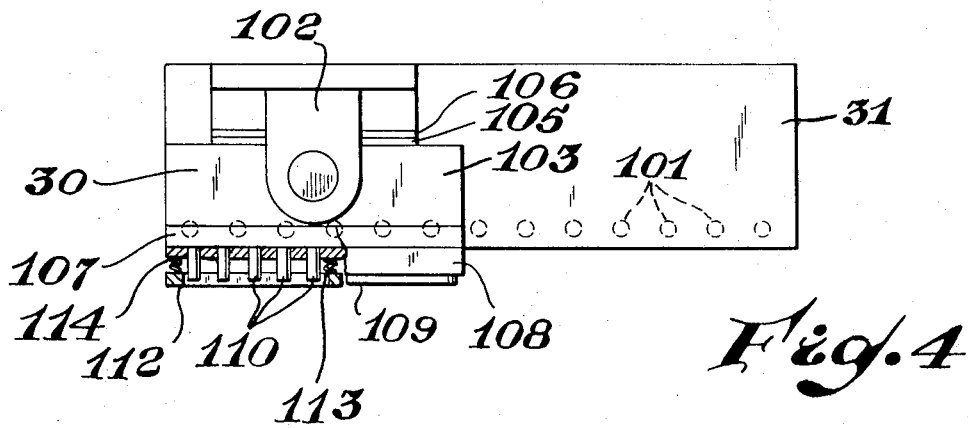
FIG. 4 is a schematic side view of a welding head and cam follower plate of the apparatus of FIG. 1.

In FIG. 4 there is depicted a view of the head 30 and cam follower plate 31. The cam follower plate 31 has affixed thereto a plurality of cam followers 101 rotatably mounted thereon and on a center-to-center spacing equal to the center-to-center spacing of the cams 77, 78 and 79 and of the cams 87, 88 and 89. The cam follower plate 31 is supported on the slidable platen 17 and maintained in alignment with the cam plate 40 as the moveable table portions 36 and 37 move along the ways 38 and 39. The welding head 30 comprises a support or yoke 102 rigidly affixed to the platen 17 (not shown). Pivotally affixed to the yoke or support 102 is a base block 103 resiliently shimmed by means of shims 105 and 106 to provide a desired angular relationship between the base 103 and the surface 74a of the anvil 74. Affixed to the base 103 is a backup plate 107 which in turn carries a work engaging member 108. The work engaging member 108 defines a flattening face 109 adapted to be generally parallel to the face 74a and compress a laminated material therebetween. The work engaging member 108 has a plurality of generally cylindrical projections 110. The projections 110 are beneficially of tungsten carbide and have faces which are ground parallel to the face 109. The projections or welding elements 110 are adapted to engage the surface 74a with their terminal ends and provide regions of high localized pressure. A stripper plate 112 is slidably disposed about the projections 110 and resiliently tensioned away from the work engaging member 108 by springs or tensioning members 113 and 114.

Figure 5:
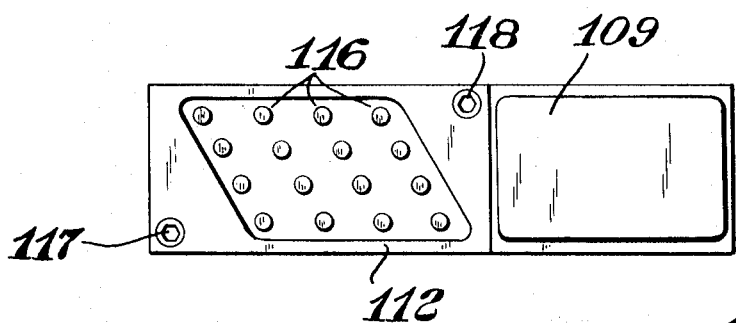
FIG. 5 is a schematic view of the bottom of the welding head of FIG. 4.

FIG. 5 is a bottom view of the head 30 of FIG. 4 showing the relative location of the flattening face 109, the stripper plate 112 and terminal faces 116 of the pressure elements 110. Retainers 117 and 118, which beneficially are cap screws in a counter bored hole, retain the stripper plate in position against the tensioning means or springs 113 and 114.

In operation of the apparatus of FIGS. 1–5, a foil such as the foil 45 is provided which may be metal or a metal-plastic laminate. The foil is unwound from the source and is joined to a second foil by first trimming the ends of the foil to a desired configuration such as a 45° oblique cut. If the foil is a laminate of plastic and metal, beneficially it is initially heat sealed together by applying heat and pressure from the jaws 52 and 53 of the bar sealer. No metal-to-metal contact is obtained in this sealing operation. The partially sealed film is then positioned against foil guides 75 and 76 in such a manner that the overlapping portions to be welded lie at least partially over the work engaging surface 74a of the anvil 74. The foil is then maintained in position by the clamps 41 and 42. The moveable portions 36 and 37 are then moved along the ways 38 and 39 until the lapped portions of the foils to be joined in the region of the foil guides 75 and 76 lie over the anvil 74. The hydraulic source 23 causes the ram 19 to move toward the lower platen 12 causing a portion of the lapped portion of the foils to be joined to be clamped by the anvil work engaging surface 74a of the anvil 74 and the terminal portion of the pins or pressure members 110 with sufficient force to cause the thermoplastic coating or layer to be displaced and provide a metal-to-metal cold weld. As the ram 19 is extended toward the base member, some of the cam followers 101 engage the first camming faces 81, 82 and 83 of the cams 77, 78 and 79, moving the moveable members 36 and 37 toward the lower right as viewed in FIG. 2. On retraction of the ram, the cam follower, which originally entered the space 94 and the space 97, is withdrawn through the space 95 again moving the moveable members in a direction toward the lower right of FIG. 2. Thus, on a complete cycle of the ram 19; that is, from the open position to the closed position and return to the open position, the moveable members 36 and 37 are advanced to the lower right as shown in FIG. 2 by a distance equal to the spacing between the cam followers. The foregoing cycle is repeated a desired number of times until the entire width of the foils to be joined is traversed. Each time the moveable members and foil progress, cold welding is obtained in the regions clamped between the faces 116 of the members 110 and the anvil surface 74a. This causes minor displacement of both the foil and thermoplastic material which is subsequently flattened by the face 109 as the lap of the films to be joined is traversed across the working surface 74a. The stripper plate 112 conveniently forces the release of the material being joined from the terminal ends 116 of the members 110 and may be omitted if a release lubricant is employed. As depicted, the seal, weld, joint or splice obtained with the apparatus is angularly disposed with relation to the longitudinal and transverse direction of the foil and results in minimal disturbance of the roll geometry when the spliced material is formed into a roll.

Apparatus substantially as depicted in FIG. 1 is found eminently satisfactory for joining laminates of 5-mil thick aluminum and 2.5-mil thick ethylene acrylic acid polymer (88 parts ethylene; 12 parts acrylic acid).

In a similar manner, 5-mil thick dead soft aluminum is cold welded satisfactorily employing the apparatus of the invention.

As is apparent from the foregoing specification, the present invention is susceptible of being embodied with various alterations and modifications which may differ particularly from those that have been described in the preceding specification and description.

What is claimed is:

1. An apparatus for the cold welding, by mechanically applied pressure, of metallic foils in the form of a tape or ribbon, the apparatus comprising
a press, the press having
a reciprocating ram, the ram supporting at least
one pressure element having a work engaging terminal end,
an anvil oppositely disposed from said ram and arranged to clamp foils to be joined between said pressure element terminal end and said anvil and to supply sufficient pressure thereto to cold weld foils disposed therebetween, the improvement which comprises
a foil support table, the foil support table comprising
a first portion and
a second portion, each of the table portions being disposed adjacent said anvil with the anvil between the table portions, each table portion having
a foil retaining means,
means to move said table relative to said anvil in a sequential stepwise manner in a desired direction, said means actuated by reciprocation of the ram.

2. The apparatus of claim 1 including a plurality of pressure elements.

3. The apparatus of claim 1 including a foil flattening means disposed adjacent said pressure elements and adapted to clamp a foil between the flattening means and the anvil.

4. The apparatus of claim 1 wherein the means to move said table comprises a cam and cam follower.

5. The apparatus of claim 4 wherein a plurality of spaced apart cams and cam followers are employed, the cams and cam followers being actuated by reciprocation of the ram.

6. The apparatus of claim 1 wherein the foil retaining means comprises a clamp.

7. The apparatus of claim 1 including a resiliently loaded stripper plate in operative association with a pressure element.

8. The apparatus of claim 1 in operative association with a foil supply means adapted to supply foil in a direction obliquely arranged relative to the motion of said table.

9. The apparatus of claim 1 wherein the means to move said table comprises a plurality of cams and cam followers in fixed regularly spaced cooperative arrangement.

10. An apparatus for the cold welding of metallic foil, the apparatus comprising
 a base, the base having
 a reciprocating ram, the ram supporting
 a plurality of pressure elements,
 an anvil oppositely disposed from said ram and adapted to clamp a foil between the pressure elements and said anvil and to supply sufficient pressure thereto to cold weld a cold weldable foil disposed therebetween, the improvement which comprises
 a foil support table, the foil support table comprising first and
 second fixed support elements having
 generally planar upwardly facing surfaces and having
 support faces remotely disposed from the ram, the fixed portions defining a space therebetween, the support faces of the fixed portions being coplanar with the anvil and the anvil being disposed within the space,
 a moveable support having
 foil supporting surfaces, the moveable support being disposed within the space and the support surfaces being generally coplanar with the surfaces of the fixed portions,
 first and second clamping means affixed to the moveable portion and adapted to clamp a foil thereto, the moveable portion of the supporting surfaces disposed on opposite sides of the anvil,
 a cam plate affixed to the moveable portion, the cam plate having
 a plurality of double faced cams and
 a plurality of single faced cams, each of the double faced cams having a first face and a second face, the first face of the double faced cams adapted to engage a cam follower on motion of the cam toward the anvil and advance the table in a desired direction, the second face of the double faced cam adapted to engage a cam of the cam follower when the ram is withdrawn from the anvil and move the table in a desired direction, the plurality of single faced cams having single camming faces, the single faced camming faces being adapted to engage a cam follower when the ram approaches the anvil and subsequent to the engagement of the cam with the second camming face of the double faced cams and move the table in a desired direction,
 a cam follower support affixed to said ram, the support carrying
 a plurality of cam followers generally linearly arranged and adapted to act with the camming faces of the double and single faced cams,
 a stripper plate having a plurality of openings adapted to slidably receive the pressure elements, the pressure elements being slidably positioned within the stripper plate, the stripper plate being resiliently tensioned toward the anvil and to expose terminal portions of the pins adjacent the anvil when pressure is applied thereto and to enclose the pressure elements remote from the anvil, and
 an anvil engaging surface disposed adjacent the pressure elements and in fixed relationship thereto.

11. An apparatus for the cold welding of metallic foils, the apparatus comprising
 a press, the press having
 a reciprocating ram, the ram supporting at least
 one pressure element,
 an anvil oppositely disposed from said ram and arranged to clamp a foil to be joined between said pressure element and said anvil and to supply sufficient pressure thereto to cold weld a foil disposed therebetween, the improvement which comprises
 a foil support table, the foil support table comprising
 a first portion and
 a second portion, each of the table portions having
 a foil retaining means,
 means to move said table relative to said anvil in a sequential stepwise manner upon reciprocation of the ram, wherein the means to move said table comprises a plurality of cams and cam followers, the cams being a plurality of double faced cams and a plurality of single faced cams, each of the double faced cams having a first face and a second face, the first face of the double faced cams adapted to engage a cam follower on motion of the ram toward the anvil and advance the table in a desired direction, the second face of the double faced cams adapted to engage a cam of the cam follower when the ram is withdrawn from the anvil and move the table in a desired direction, the plurality of single faced cams having single camming faces, the single faced camming faces being adapted to engage a cam follower when the ram approaches the anvil and subsequent to the engagement of the cam with the second camming face of the double faced cams and move the table in a desired direction.

12. The apparatus of claim 1 including heat sealing apparatus having at least two jaws and suited to bond the plastic coating of plastic coated foils together.

* * * * *